US008930936B2

(12) United States Patent
Exton et al.

(10) Patent No.: US 8,930,936 B2
(45) Date of Patent: Jan. 6, 2015

(54) LOADING REMOTE BINARIES ONTO A WRITE-PROTECTED DEVICE

(71) Applicant: International Business Machines Corporation, Armonk, NY (US)

(72) Inventors: Scott A. Exton, Gold Coast (AU); Anthony B. Ferguson, Gold Coast (AU); Christopher J. Hockings, Gold Coast (AU); Davin J. Holmes, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 13/669,930

(22) Filed: Nov. 6, 2012

(65) Prior Publication Data

US 2014/0130030 A1 May 8, 2014

(51) Int. Cl.
*G06F 9/44* (2006.01)
(52) U.S. Cl.
USPC .......................... 717/171; 717/172; 717/174
(58) Field of Classification Search
USPC .................... 717/171–176; 709/203
IPC ........................ G06F 8/20,8/52, 8/61, 8/65, 8/70
See application file for complete search history.

(56) References Cited

U.S. PATENT DOCUMENTS

| 5,905,990 | A | 5/1999 | Inglett |
| 6,330,648 | B1* | 12/2001 | Wambach et al. ............ 711/163 |
| 6,748,591 | B1 | 6/2004 | Lewallen |
| 6,832,373 | B2* | 12/2004 | O'Neill ......................... 717/171 |
| 6,966,058 | B2 | 11/2005 | Earl et al. |
| 7,036,007 | B2 | 4/2006 | Schelling et al. |
| 7,188,331 | B2* | 3/2007 | Culter ............................. 717/100 |
| 7,376,945 | B1* | 5/2008 | Kakumani et al. ............. 717/171 |
| 7,409,685 | B2* | 8/2008 | Chen et al. .................... 717/170 |
| 7,461,374 | B1* | 12/2008 | Balint et al. ................... 717/174 |
| 7,644,405 | B2* | 1/2010 | Rao et al. ....................... 717/171 |
| 7,661,102 | B2* | 2/2010 | Ogle .............................. 717/168 |
| 7,849,459 | B2* | 12/2010 | Burkhart et al. ............... 717/174 |
| 8,074,217 | B2* | 12/2011 | James et al. ................... 717/175 |
| 8,150,914 | B1* | 4/2012 | Taneja et al. ................... 709/203 |
| 8,196,133 | B2* | 6/2012 | Kakumani et al. ............. 717/172 |
| 8,261,256 | B1* | 9/2012 | Adler et al. .................... 717/173 |
| 8,281,119 | B1 | 10/2012 | Spangler et al. |
| 8,302,210 | B2* | 10/2012 | Myles et al. .................... 726/30 |

(Continued)

OTHER PUBLICATIONS

Fousse et al, "MPFR: A Multiple-Precision Binary Floating-Point Library With Correct Rounding", ACM Transactions on Mathematical Software, vol. 33, No. 2, Article 13, pp. 1-15, 2007.*

(Continued)

*Primary Examiner* — Anil Khatri
(74) *Attorney, Agent, or Firm* — Lee Law, PLLC; Christopher B. Lee

(57) ABSTRACT

A binary library overload instruction is received at an embedded computing device that executes a write-protected firmware build. The binary library overload instruction specifies a write-protected binary library of the write-protected firmware build to be overloaded by execution of an alternative binary library instead of the write-protected binary library of the write-protected firmware build. The alternative binary library is configured within a random access memory (RAM) storage area to execute instead of the write-protected binary library as specified in the received binary library overload instruction. The write-protected firmware build is executed using the alternative binary library instead of the write-protected binary library specified in the binary library overload instruction.

20 Claims, 6 Drawing Sheets

(56) References Cited

U.S. PATENT DOCUMENTS

| | | | |
|---|---|---|---|
| 8,332,839 B2* | 12/2012 | Daftardar | 717/173 |
| 8,464,228 B2 | 6/2013 | Campbell | |
| 8,468,515 B2* | 6/2013 | Chen et al. | 717/170 |
| 8,555,273 B1* | 10/2013 | Chia et al. | 717/173 |
| 8,584,117 B2* | 11/2013 | Davies | 717/174 |
| 8,606,892 B2* | 12/2013 | Mallur et al. | 709/221 |
| 8,752,008 B2 | 6/2014 | Herdeg et al. | |
| 8,789,035 B2 | 7/2014 | McCarthy et al. | |
| 8,800,042 B2* | 8/2014 | Sima et al. | 726/25 |
| 2012/0110558 A1 | 5/2012 | Anan et al. | |

OTHER PUBLICATIONS

Dig et al, "ReBA: a Tool for Generating Binary Adapters for Evolving Java Libraries", ACM, pp. 963-964, 2008.*

Hu et al, "Duet: Library Integrity Verification for Android Applications", ACM, pp. 141-152, 2014.*

Zhang et al, "A Platform for Secure Static Binary Instrumentation", ACM, pp. 129-140, 2014.*

United States Patent and Trademark Office, Office Action for U.S. Appl. No. 14/054,115, Sep. 3, 2014, pp. 1-23, Alexandria, VA, USA.

* cited by examiner

LOADING REMOTE BINARIES ONTO A WRITE-PROTECTED DEVICE

BACKGROUND

The present invention relates to binary code distribution. More particularly, the present invention relates to loading remote binaries onto a write-protected device.

Firmware for deployed products evolves over time as features are added and issues are identified. Appliance architectures dictate that product increments (e.g., bug fixes or updates) be delivered as firmware updates. A firmware update replaces the entire set of system binaries and programs that are executed by a product, even if only a portion of the firmware was changed.

BRIEF SUMMARY

A method includes receiving, at an embedded computing device that executes a write-protected firmware build, a binary library overload instruction that specifies a write-protected binary library of the write-protected firmware build to be overloaded by execution of an alternative binary library instead of the write-protected binary library of the write-protected firmware build; configuring, within a random access memory (RAM) storage area, the alternative binary library to execute instead of the write-protected binary library as specified in the received binary library overload instruction; and executing the write-protected firmware build using the alternative binary library instead of the write-protected binary library specified in the binary library overload instruction.

A system includes a memory and a processor programmed to: receive, at an embedded computing device that executes a write-protected firmware build, a binary library overload instruction that specifies a write-protected binary library of the write-protected firmware build to be overloaded by execution of an alternative binary library instead of the write-protected binary library of the write-protected firmware build; configure, within a random access memory (RAM) storage area of the memory, the alternative binary library to execute instead of the write-protected binary library as specified in the received binary library overload instruction; and execute the write-protected firmware build using the alternative binary library instead of the write-protected binary library specified in the binary library overload instruction.

A computer program product includes a computer readable storage medium having computer readable program code embodied therewith, where the computer readable program code when executed on an embedded computing device causes the embedded computing device to: receive a binary library overload instruction that specifies a write-protected binary library of a write-protected firmware build executed by the embedded computing device to be overloaded by execution of an alternative binary library instead of the write-protected binary library of the write-protected firmware build; configure, within a random access memory (RAM) storage area, the alternative binary library to execute instead of the write-protected binary library as specified in the received binary library overload instruction; and execute the write-protected firmware build using the alternative binary library instead of the write-protected binary library specified in the binary library overload instruction.

DETAILED DESCRIPTION

Figure 1:
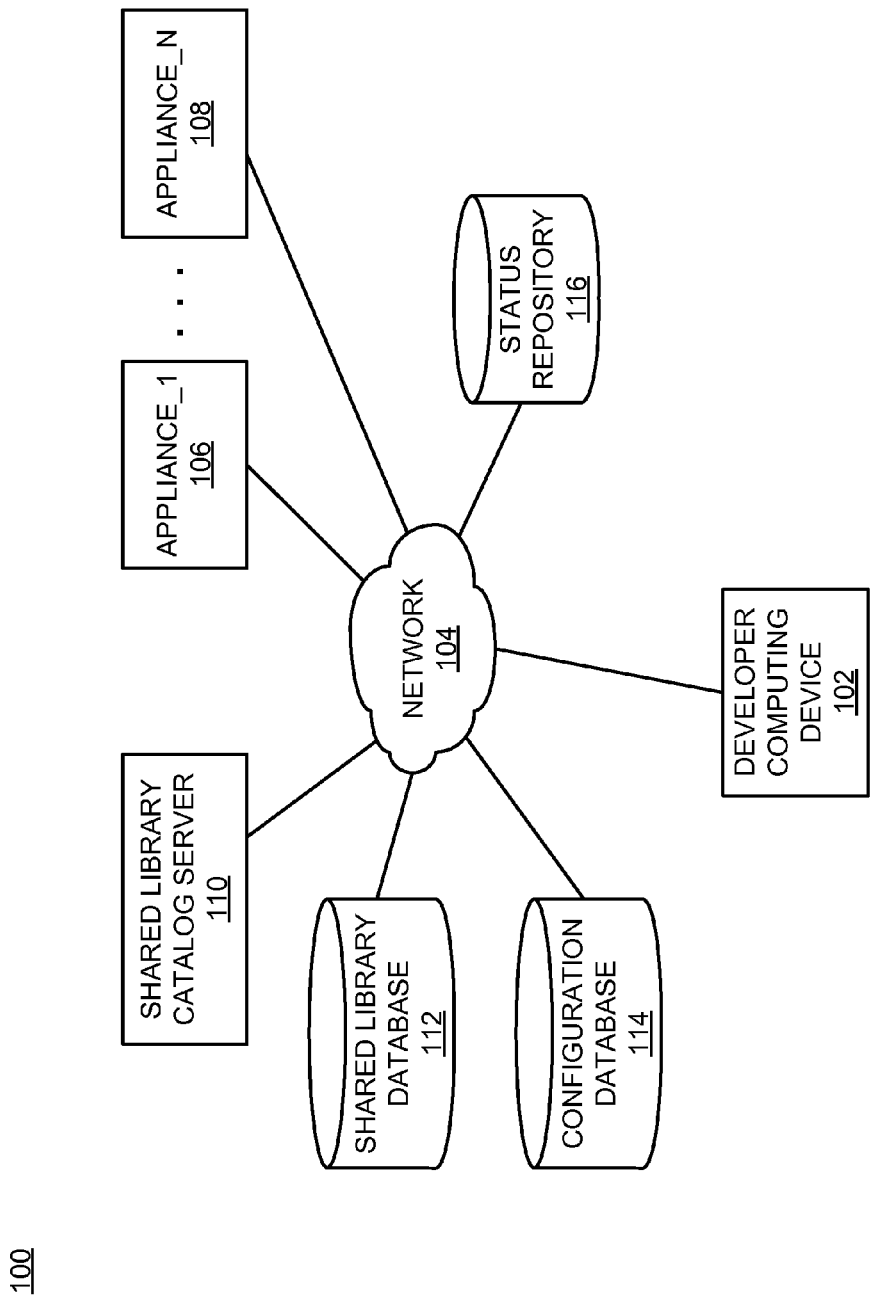
FIG. 1 is a block diagram of an example of an implementation of a system for loading remote binaries onto a write-protected device according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides technology for loading remote binaries onto a write-protected device. The present subject matter facilitates remotely loading (e.g., "pushing") one or more alternative shared binary libraries onto an appliance computing device (alternatively "appliance"). The appliance is instructed to execute the designated alternative shared binary libraries instead of corresponding write-protected binary libraries that form a part of a write-protected firmware build executed by the appliance. The operation of replacing during execution a write-protected binary library that is part of the write-protected firmware build executed by the appliance is termed herein as "overloading" the write-protected binary library. To overload write-protected binary libraries, the appliance receives and stores each designated alternative binary library in non-permanent storage (e.g., a random access memory (RAM) storage area, RAM disk, etc.), and sets an environment variable to instruct the appliance to restart the binary library/libraries to be overloaded and to instead use the designated alternative binary libraries during execution. The appliance restarts the binary libraries as instructed by the environment variable to test execution of the designated alternative binary libraries. The execution of the appliance may be reverted at any time to use the write-protected firmware build by performing a restart that clears the non-permanent storage of the alternative binary library and the environment variable, or by clearing the environment variable and restarting the respective write-protected binary libraries that were overloaded.

As such, the present technology facilitates testing of feature upgrades and fixes within deployed appliances without requiring the appliances to have their firmware completely re-installed/upgraded with a new firmware build. By using granularity at the binary library level, deployment of selected portions of firmware may be tailored to the particular code changes to be tested. The present technology further allows rapid reversion to the configured write-protected firmware build. Accordingly, stability of firmware upgrades/changes may be evaluated within real deployed computing platforms prior to release and installation of new firmware builds to the deployed computing platforms.

The alternative binary libraries under test may be configured to provide status/developer feedback that indicates that the alternative binary libraries are being executed. The alternative binary libraries under test may additionally be configured to record status information during execution and to provide the status information to developers as binary library execution feedback.

Appliances and appliance computing devices are used for purposes of example herein. However, it is understood that the present technology may be applied to any embedded form of computing device that utilizes any write-protected firmware.

By using firmware partitioning at the binary library level of granularity, binary libraries operate as partitions that may be selectively uploaded and executed. The alternative binary library is configured to have the same interface and interface names as the write-protected binary library to be overloaded, and is essentially a different/new version of the write-protected binary library to be overloaded. This new version may include any new features and changes for the partitioned firmware portion, as appropriate for a given implementation. As such, the alternative binary library with the new features/changes may be seamlessly integrated to execute with the write-protected firmware build and to replace the write-protected binary library specified to be overloaded. When a given library and set of features/upgrades has been fully verified using the in-system deployment, the write-protected firmware of the deployed appliance may then be formally upgraded with the new functionality of the alternative binary library that was used/evaluated during the overload operation.

A remote master shared library server manager (remote from the appliances) manages a remote catalog of available shared binary libraries. For purposes of the present subject matter, the concept of "shared" binary libraries refers to binary libraries that may be installed on multiple appliance computing devices. The master shared library server manager is responsible for distributing (e.g., performing a "push" of) the individual shared binary libraries to various deployed appliances in a system upon request. The master shared library server manager instructs appliances to load these independent and remotely stored binaries using the binary deployment technology described herein. The alternative binary libraries under test may generate and return status information, such as execution results, to provide developer feedback.

For purposes of the present description, an "appliance" or "appliance computing device" is a computing device that may be deployed with specific hardware and software to perform a particular task. It is understood that, while appliances are used for purposes of example herein, the present technology may be applied to any embedded computing device that utilizes a firmware build with binary library-based code/build partitioning. It is further understood that, unlike a general computer that utilizes patches and updates that are downloaded and installed periodically, an appliance or embedded computing device may utilize embedded firmware code (e.g., operating system, kernel, drivers, application-level code, etc.) that is only updatable with permanence by updating the entire firmware build that is installed on the appliance. As such, the firmware includes the operating system along with all of the other software to perform the appliance's or the embedded computing device's processing tasks. An appliance may additionally have a browser interface for selecting from a set of configuration options, though these options are not updatable by a user of the appliance. As such, an appliance represents one form of embedded computing device, though an appliance may implement a more formal and feature-rich operating system, kernel, and complex security protocols for communications rather than custom/reduced versions used in certain embedded computing devices.

It should be noted that conception of the present subject matter resulted from recognition of certain limitations associated with loading of executable code onto remote deployed devices. For example, several problems with firmware updates were observed. It was observed that because firmware updates replace an entire set of system binaries and programs with each update, firmware updates prevent rapid testing of changes that may only affect a small number of the binaries because all binaries must be loaded. It was further observed that because appliance file systems are traditionally "read only" and do not allow individual program binaries to be added to a system, the problem of firmware updates is compounded within appliance-type systems. It was further observed that several additional problems are associated with providing an entire firmware update when testing changes. These observed problems include a high cost associated with refreshing the firmware, a long length of time associated with the download and installation of the firmware, high overhead associated with the execution of regression test cases, and high risk associated with refreshing the entire firmware within a deployed product. It was further observed that, while a full backup may be performed prior to installing an entire firmware load to test a single small change, such an approach does not help assess the impact of a single change to the system, and requires the entire firmware to be delivered to test the single change. The present technology improves remote binary loading into deployed products (or products under development) by providing technology for loading remote binaries onto a write-protected device, as described above and in more detail below.

The present technology improves the ability to detect a cause of failure in instances where small changes (e.g., features/upgrades) are made to a product. The present technology further improves problem determination by allowing incremental binary changes to be made without complete firmware changes, which reduces the demands on the size of the file system of the device by removing the need to provide additional storage to accommodate firmware reversion. The present technology also increases problem resolution options in support situations by providing a way to test changes or to introduce alternative binary libraries for problem determination without having to replace the entire firmware. The present technology additionally improves serviceability because reverting back to original firmware is a configuration change rather than a firmware installation operation. As such, improved product development and feature evolution may be obtained through use of the present technology.

The technology for loading remote binaries onto a write-protected device described herein may be performed in real time to allow prompt loading of portions of deployed sets of binary libraries. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for loading remote binaries onto a write-protected device. A developer computing device 102 communicates via a network 104 with several other devices and may be used to initiate deployment of individual alternative binary libraries to an appliance_1 106 through an appliance_N 108 utilizing a shared library catalog server 110. The shared library catalog server 110 manages a shared library database 112 and a configuration database 114.

The development computing device 102 may be used to create and build one or more alternative binary library files that include one or more alternative binary libraries to be tested. The alternative binary libraries may be tested by overloading one or more corresponding write-protected binary libraries within a firmware build of one or more of the appliance_1 106 through the appliance_N 108. The development computing device 102 may send the respective alternative binary library file(s) to the shared library catalog server 110 with an instruction to store the alternative binary library file(s) within the shared library database 112 and to distribute the alternative binary library file(s) to the designated appliance devices. The development computing device 102 may also send configuration information to the shared library catalog server 110 with an instruction to store the configuration information within the configuration database 114 and to distribute the configuration information to the designated appliance devices.

The shared library catalog server 110 may send the respective alternative binary library file(s) and configuration information to the respective appliance device(s) 106 through 108. The shared library catalog server 110 may instruct the respective appliance device(s) 106 through 108 to load the individual alternative binary libraries based upon the configuration information, and to execute the alternative binary library file(s) in association with the current firmware build installed on the respective appliance device(s) 106 through 108 based upon configuration information stored within the configuration database 114.

The designated appliance device(s) 106 through 108 may load and execute the alternative binary libraries in association with the currently-installed firmware build, and generate status information in association with execution of the alternative binary libraries. The status information may be stored within the status repository 116. The status information stored within the status repository 116 may be accessed by the shared library catalog server 110 and the development computing device 102 for analysis and evaluation of the execution of the alternative binary libraries in association with the firmware build installed on the respective appliance device(s) 106 through 108. The status information may include a listing of which binary libraries are loaded (including one or more overloaded libraries), execution results, and other information as appropriate for a given implementation. As such, the present technology facilitates distribution and execution of individual alternative binary libraries by appliance computing devices without a complete firmware change on the appliance computing devices.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
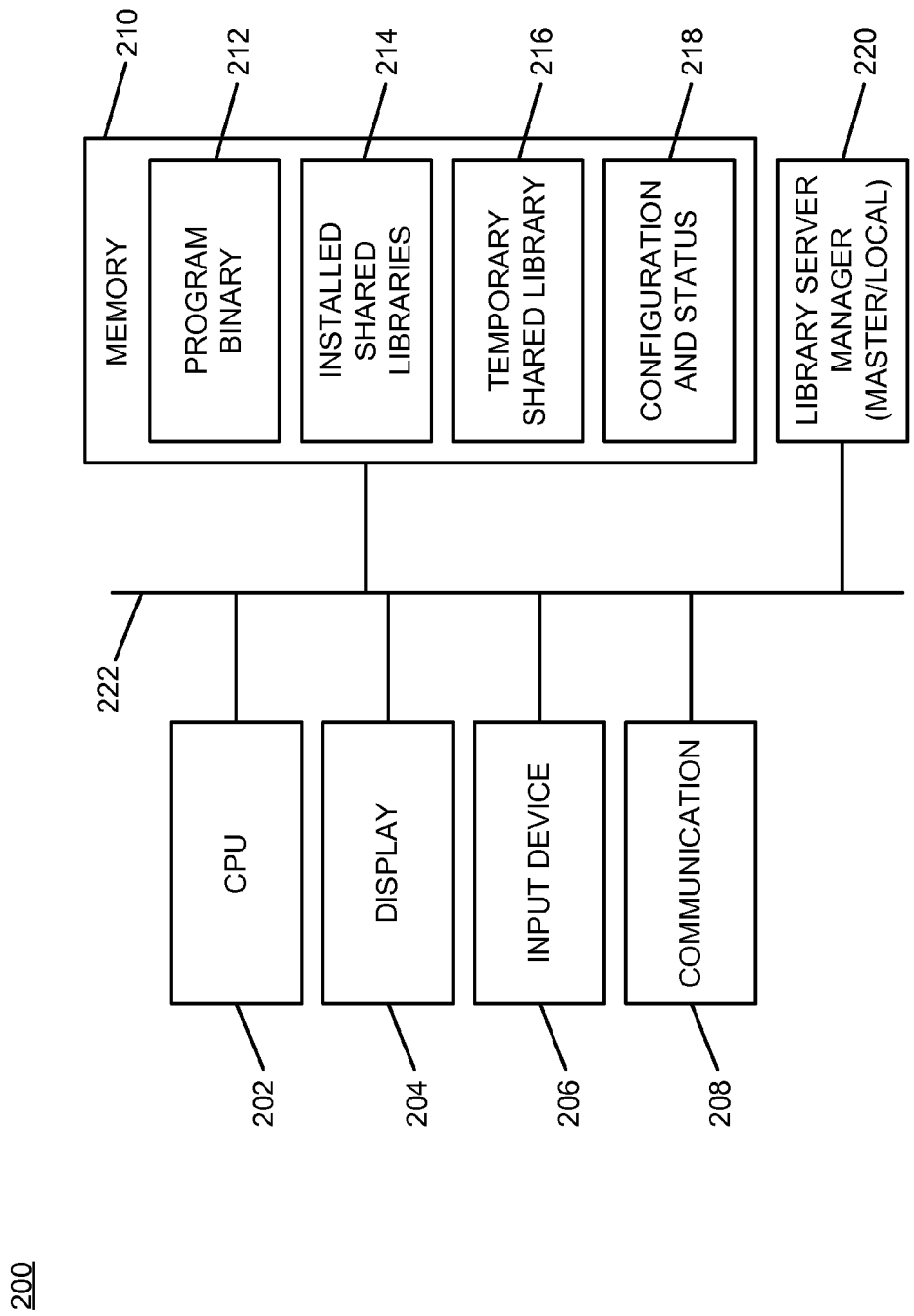
FIG. 2 is a block diagram of an example of an implementation of a core processing module capable of loading remote binaries onto a write-protected device according to an embodiment of the present subject matter.

FIG. 2 is a block diagram of an example of an implementation of a core processing module 200 capable of loading remote binaries onto a write-protected device. The core processing module 200 may be associated with any of the developer computing device 102, appliance_1 106 through the appliance_N 108, and the shared library catalog server 110, in a manner appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of loading remote binaries onto a write-protected device in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

Certain additional details of the memory 210 are provided to illustrate certain specific aspects for implementation of the core processing module 200 within the appliance_1 106 through the appliance_N 108 (alternatively "appliance computing device"). For such implementations, the memory 210 may include a program binary area 212 that stores and provides execution space for firmware that is installed for operation of the respective appliance computing device. An installed shared libraries area 214 stores and provides execution space for shared binary libraries that form a portion of a particular firmware build that is installed for operation of the respective appliance computing device. A temporary shared library area 216 stores and provides execution space for remote alternative shared binary libraries (e.g., binary library files that include one or more binary libraries) that are downloaded to an appliance computing device for evaluation, as described above and in more detail below. The alternative shared binary libraries downloaded and executed in association with the temporary shared library area 216 may replace or augment installed shared binary libraries that form a portion of a particular firmware build that is installed for operation of the respective appliance computing device (as stored within the installed shared libraries area 214).

It should be noted that the temporary shared library area 216 may be implemented as a random access memory (RAM) disk or other form of a volatile memory configuration as appropriate for a given implementation. By use of some form of volatile memory, the downloaded and executed alternative binary libraries may be deleted by reboot/restart of the system. As such, the appliance computing device may be reverted to its original/installed firmware build by a reboot/restart without additional overhead. Accordingly, efficiency of testing incremental changes to alternative binary libraries may be further improved by use of volatile storage.

A configuration and status area 218 stores configuration information and execution instructions received from the shared library catalog server 110. The appliance computing device may be instructed, as described above, to use configuration information received and stored within the configuration and status area 218 to select one or more alternative binary libraries stored in the temporary shared library area 216 for execution during one or more execution cycles (e.g., restarts). The appliance computing device may store status information generated by the appliance computing device during execution of the configured alternative binary libraries, such as prior to storing the status information to the status repository 116. It should be noted that the configuration and status area 218 may also utilize volatile memory to allow reversion of an appliance computing device to its original/installed firmware build by a reboot/restart without additional overhead.

Though not illustrated within FIG. 2, the shared library catalog server 110, the configuration database 114, and the status repository 116 may each be associated with the core processing module 200, as appropriate for a given implementation. As such, the respective databases may be coupled to the core processing module 200 without requiring external connectivity, such as via the network 104. Further, the information stored within the respective databases may also/alternatively be stored within the memory 210 without departure from the scope of the present subject matter.

A library server manager module 220 is also illustrated. The library server manager module 220 provides functionality for shared binary library management with the core processing module 200, as described above and in more detail below. The library server manager module 220 module 214 implements the automated loading remote binaries onto a write-protected device of the core processing module 200.

The library server manager module 220 may be implemented and referred to as a "master" library server manager module 220 on the shared library catalog server 110, and may be implemented and referred to as a "local" library server manager module 220 on the appliance_1 106 through the appliance_N 108. This dual nature of the operation of the library server manager module 220 is represented with the "MASTER/LOCAL" designation within FIG. 2. The "master" library server manager module 220 implemented on the shared library catalog server 110 may instruct the "local" library server manager module 220 implemented on a particular appliance computing device to load and execute a particular alternative binary library. As a complementary operation, the "local" library server manager module 220 on the respective appliance computing device may configure the designated alternative binary libraries for execution and perform other execution control tasks, in addition to creating status in association with execution of the designated alternative binary libraries and storing the created status to the status repository 116. As such, the library server manager module 220 may implement complementary processing for loading remote binaries onto a write-protected device in association with each implementation.

It should also be noted that the library server manager module 220 may form a portion of other circuitry described without departure from the scope of the present subject matter. Further, the library server manager module 220 may alternatively be implemented as an application stored within the memory 210. In such an implementation, the library server manager module 220 may include instructions executed by the CPU 202 for performing the functionality described herein. The CPU 202 may execute these instructions to provide the processing capabilities described above and in more detail below for the core processing module 200. The library server manager module 220 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the library server manager module 220 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
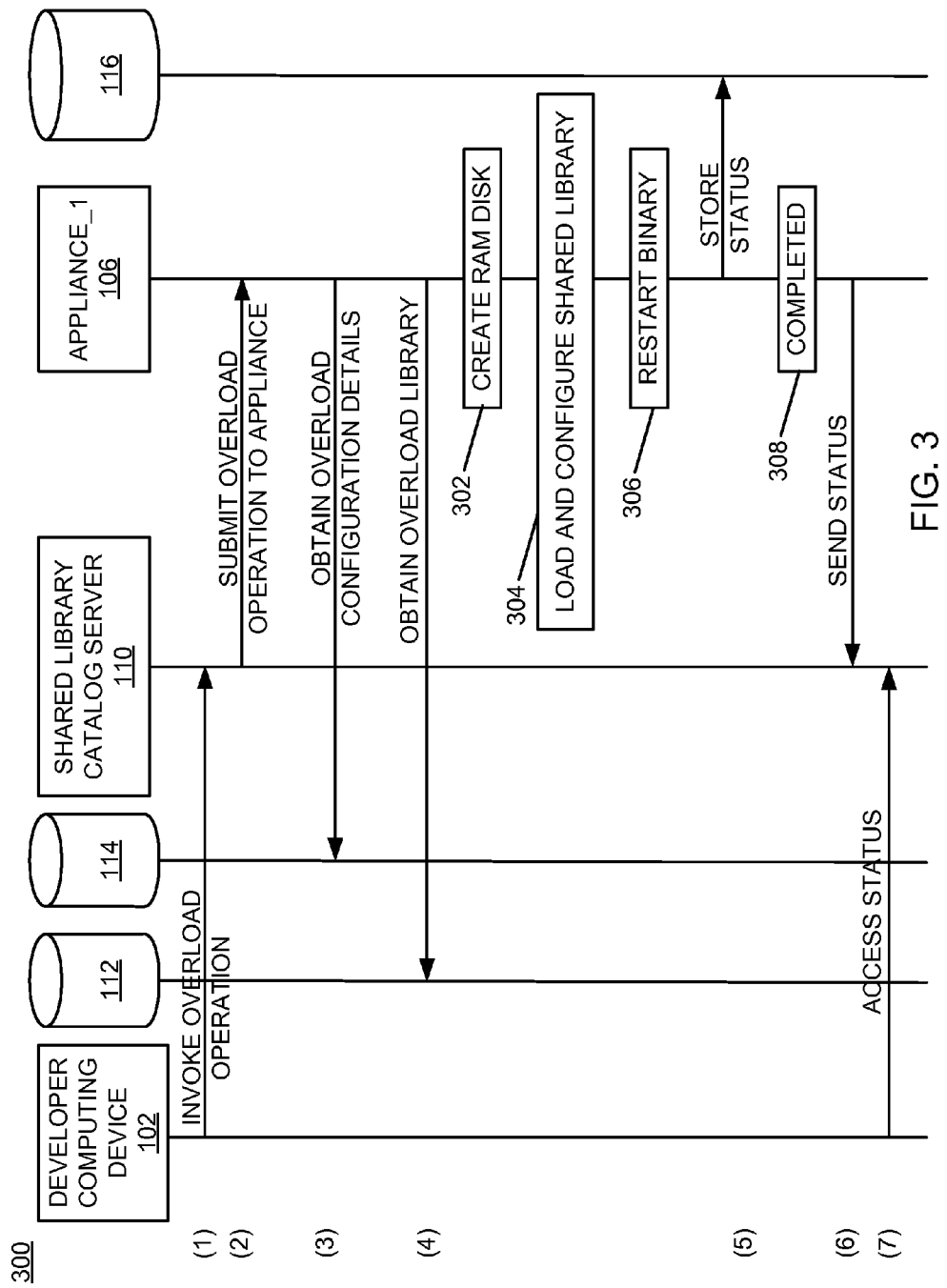
FIG. 3 is a message flow diagram of an example of an implementation of a message flow for loading remote binaries onto a write-protected device according to an embodiment of the present subject matter.

FIG. 3 is a message flow diagram of an example of an implementation of a message flow 300 for loading remote binaries onto a write-protected device. The message flow 300 may be executed between the "master" library server manager module 220 executing on the shared library catalog server 110 and the "local" library server manager module 220 on the appliance_1 106. It is understood that although only the appliance_1 106 is illustrated, similar processing may be performed in association with each of the appliance_1 106 through the appliance_N 108. Additionally, the text names of the shared library database 112, the configuration database 114, and the status repository 116 are not illustrated within FIG. 3 to avoid crowding within the drawing. It should be noted that while the present example references a single write-protected shared binary library that is overloaded, more than one write-protected shared binary library may be overloaded as appropriate for a given implementation.

Processing for loading remote binaries onto a write-protected device may begin with a user logging into the "master" library server manager module 220 of the shared library catalog server 110 from the developer computing device 102 and invoking a shared binary library overload operation (line 1). Invoking the shared binary library overload operation may include providing configuration information that may be used by the "master" library server manager module 220 of the shared library catalog server 110 to configure the appliance_1 106 (and other appliances) to perform an overload operation for one or more specified write-protected shared binary libraries. The configuration information may include a target hostname of the server (e.g., the appliance_1 106) with a write-protected shared binary library on which the shared binary library overload operation is to be performed, a name of the binary file that is to have one or more of its shared libraries overloaded, a storage location (e.g., the shared library database 112) of the binary library file that includes the alternative binary library to be loaded during the overloading process, credentials to allow access to the alternative binary library, and an integrity check value associated with the alternative binary library (or with each write-protected binary library to be overloaded).

Once all the information has been conveyed to the "master" library server manager module 220 of the shared library catalog server 110, the "master" library server manager module 220 of the shared library catalog server 110 submits the overload operation to the "local" library server manager module 220 of the appliance_1 106 (line 2). Submission of the overload operation to the "local" library server manager module 220 of the appliance_1 106 may be performed via a secured web services connection.

The "local" library server manager module 220 of the appliance_1 106 accepts the request from the "master" library server manager module 220 of the shared library catalog server 110 and calls back to the "master" library server manager module 220 of the shared library catalog server 110, again via a secured connection to obtain the overload operation configuration details/information, which may be obtained from the configuration database 114 (line 3). These configuration details may include all or relevant portions of the configuration details established by the user.

Trace capture (e.g., status information) for the overload operation may begin in association with acceptance of the overload operation for processing. Alternative, trace capture for the overload operation may begin at another point in time as appropriate for a given implementation. The trace information may be stored to the status repository 116, as described in more detail below.

The "local" library server manager module 220 of the appliance_1 106 connects to the shared library database 112 associated with the shared library catalog server 110 and obtains the binary file that includes the alternative binary library using the obtained configuration information (line 4). The "local" library server manager module 220 of the appliance_1 106 creates a local random access memory disk at block 302. At block 304, the "local" library server manager module 220 of the appliance_1 106 loads the alternative binary library onto the random access memory disk and configures the alternative binary library for execution.

The "local" library server manager module 220 of the appliance_1 106 identifies whether the configured write-protected binary library that is to be overloaded is active and terminates the process (if active). The "local" library server manager module 220 of the appliance_1 106 then sets an environment variable (e.g., LD_PRELOAD) to indicate that the alternative binary library is to be loaded during the next start-up of the binary library. The "local" library server manager module 220 of the appliance_1 106 then restarts the binary library using the alternative binary library at block 306.

It should be noted that the LD_PRELOAD environment variable represents a path variable that may be set to include one or more paths to binary files/libraries. The binary files/libraries specified within the set paths of the LD_PRELOAD environment variable may be loaded before other libraries (e.g., of equivalent name). As such, use of an environment variable, such as the LD_PRELOAD environment variable, provides one possible approach to loading the alternative binary library instead of a write-protected binary library of the same name to replace a write-protected binary library of the write-protected firmware build.

The "local" library server manager module 220 of the appliance_1 106 stores the captured trace and status information to the status repository 116 (line 5). The processing for the overload operation completes at block 308. The "local" library server manager module 220 of the appliance_1 106 sends the status of the overload operations back to the "master" library server manager module 220 of the shared library catalog server 110 (line 6). The user may access the status information at any time convenient for the user (line 7). The status information may include trace information, such as a date/time the binary was restarted, the current firmware version, processor/CPU and memory utilization while the binary was running, and any other information appropriate for a given implementation.

It should be noted that the processing described above may be completed for each binary and library that has been configured for an overload operation. Additionally, the processing described above may be completed for each binary and library that has been configured for an overload operation in association with each appliance computing device for which an overload operation has been configured.

As such, the message flow 300 illustrates processing to load remote binaries onto a write-protected device. The message flow 300 further illustrates configuring an appliance computing device to utilize an overloaded library instead of a library that forms a portion of the firmware build installed on the appliance computing device. Status of execution of the overloaded library is captured, and provided for analysis.

The following example pseudo code represents one possible example of a procedure that may be used to implement the overload operation described above.

```
If(test feature)
    retrieve config data
    foreach binary
        foreach sharedlib
            retrieve sharedlib
            load sharedlib into RAM disk
            set LD_PRELOAD to include sharedlib
        end foreach
    end foreach
    foreach binary
        restart binary
    end foreach
end if
```

The example pseudo code above makes a determination as to whether a "test feature" flag is set. If the "test feature" flag is set, the example pseudo code retrieves configuration data, as described above. For each shared library within each binary file that is designated to be overloaded, the example pseudo code retrieves the respective alternative binary library, loads the alternative binary library into a RAM disk, and sets/updates a "LD_PRELOAD" environment variable with an indication to include the respective alternative binary library in the set of libraries to be restarted. The example pseudo code also restarts each binary file, which restarts each designated alternative binary library. The binary file is the control program for the shared libraries. The binary file when restarted will then utilize the designated alternative binary library. As such, one or more binary libraries may be overloaded and restarted, as described above and in more detail below.

Figure 4:
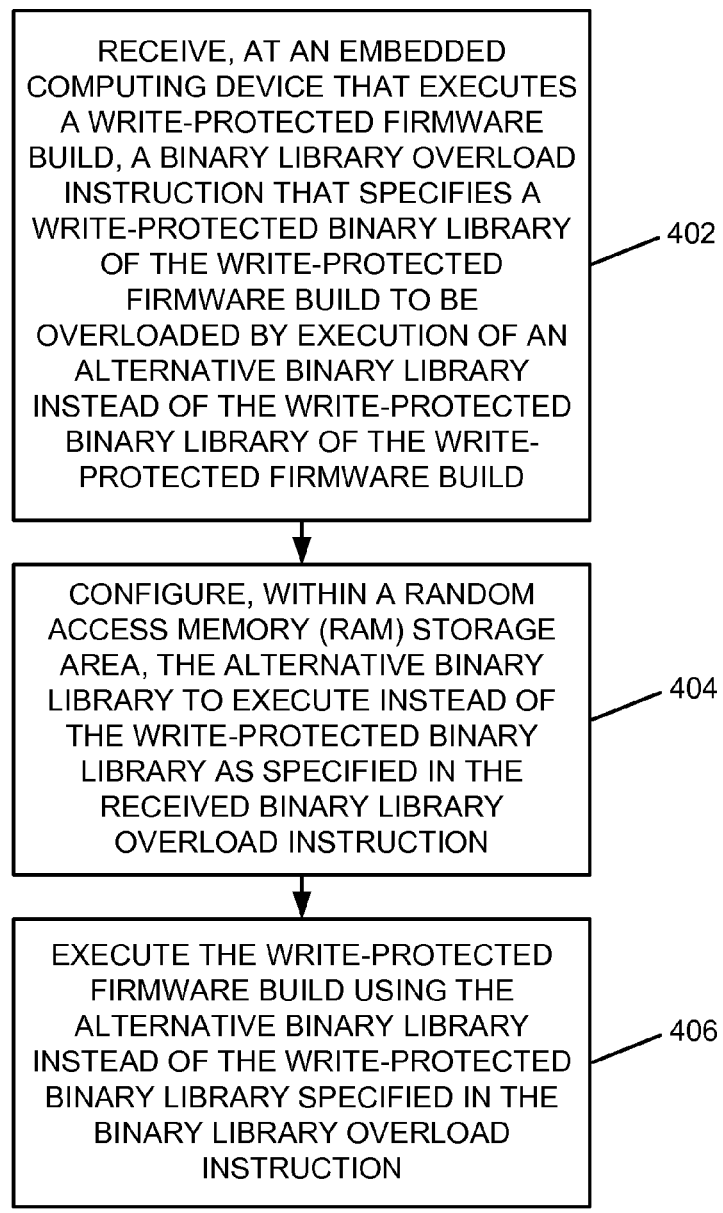
FIG. 4 is a flow chart of an example of an implementation of a process for loading remote binaries onto a write-protected device according to an embodiment of the present subject matter.
Figure 5:
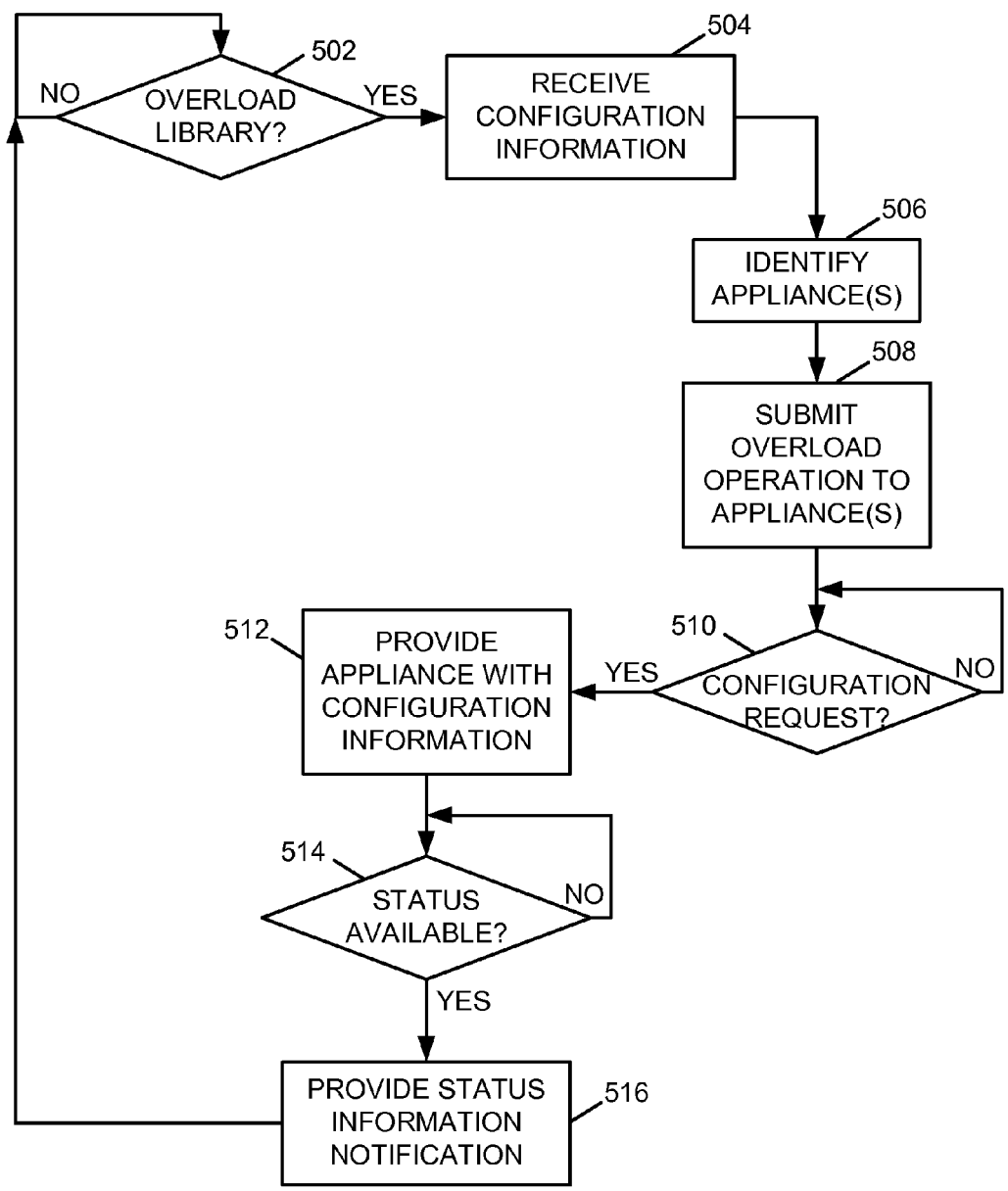
FIG. 5 is a flow chart of an example of an implementation of a process for loading remote binaries onto a write-protected device that may be executed by a master library server manager according to an embodiment of the present subject matter.
Figure 6:
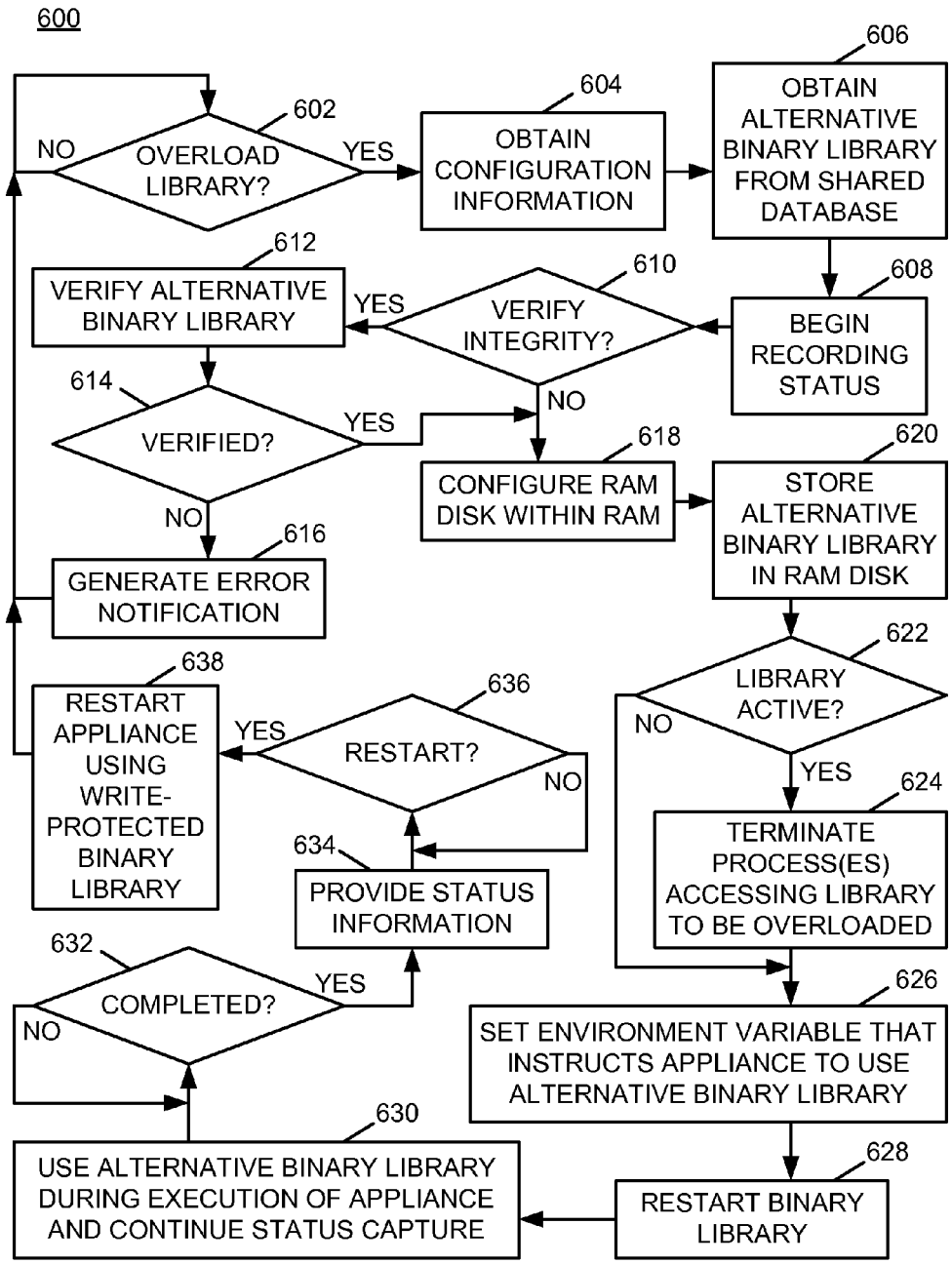
FIG. 6 is a flow chart of an example of an implementation of a process for loading remote binaries onto a write-protected device that may be executed by a local library server manager of an appliance computing device according to an embodiment of the present subject matter.

FIG. 4 through FIG. 6 described below represent example processes that may be executed by devices, such as the core processing module 200, to perform the loading of remote binaries onto a write-protected device associated with the present subject matter. Many other variations on the example processes are possible and all are considered within the scope of the present subject matter. The example processes may be performed by modules, such as the library server manager module 220 (master and local with respect to each device as described above in detail) and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for loading remote binaries onto a write-protected device. At block 402, the process 400 receives, at an embedded computing device that executes a write-protected firmware build, a binary library overload instruction that specifies a write-protected binary library of the write-protected firmware build to be overloaded by execution of an alternative binary library instead of the write-protected binary library of the write-protected firmware build. At block 404, the process 400 configures, within a random access memory (RAM) storage area, the alternative binary library to execute instead of the write-protected binary library as specified in the received binary library overload instruction. At block 406, the process 400 executes the write-protected firmware build using the alternative binary library instead of the write-protected binary library specified in the binary library overload instruction.

FIG. 5 is a flow chart of an example of an implementation of a process 500 for loading remote binaries onto a write-protected device that may be executed by a master library server manager, such as the "master" library server manager module 220 of the shared library catalog server 110. As described above, appliances are utilized for purposes of example herein, though it is understood the present technology is applicable to any embedded devices that execute a firmware build with binary library-based code/build partitioning. At decision point 502, the process 500 makes a determination as to whether a request to overload one or more write-protected binary libraries at one or more appliance computing devices has been detected. As described above, a request to overload one or more write-protected binary libraries at one or more appliance computing devices may be received from a user (e.g., a developer) in association with a login by the user to the shared library catalog server 110 from the developer computing device 102. At block 504, the process 500 receives configuration information for the library overload operation from the user. As also described above, the configuration information may include a target hostname of the server (e.g., the appliance_1 106) with the write-protected shared binary library on which the overload operation is to be performed, a name of the binary file that is to have one or more of its shared libraries overloaded, a storage location (e.g., the shared library database 112) of the binary library file that includes the alternative binary library to be loaded during the overloading process, credentials to allow access to the alternative binary library, and an integrity check value associated with the alternative binary library (or with each write-protected shared binary library to be overloaded).

At block 506, the process 500 identifies the appliance(s) with the shared binary library on which the overload operation is to be performed from the received configuration information. At block 508, the process 500 submits the overload operation to the identified appliance(s). Submission of the overload operation to the identified appliance(s) may include sending a binary library overload instruction and connection information for establishing a connection to a configuration information database, such as the configuration database 114, to each identified appliance.

At decision point 510, the process 500 makes a determination as to whether a configuration request has been received from the identified appliance(s) designated for the binary library overload operation. The configuration request may be received via a distinct secured web services connection established by each appliance to the configuration database 114 as facilitated by the shared library catalog server 110. It should be understood that this processing and subsequent processing within the process 500 may be performed for each such appliance with the write-protected shared binary library on which the overload operation is to be performed. Further, such processing may be performed by different threads of operation.

At block 512, the process 500 provides the configuration information to each identified appliance(s). The configuration information may include the relevant information usable by the appliance to execute the overload operation as received from the user/developer and may include connection information for establishing a connection to a shared library database, such as the shared library database 112.

At decision point 514, the process 500 makes a determination as to whether alternative binary library overload operation status information has been received from the respective appliances. In response to each receipt of overload operation status information from an appliance in association with each thread of operation, the process 500 provides the received status information to the user/developer, such as by sending the alternative binary library overload operation status information to the developer computing device 102. The process 500 returns to decision point 502 and iterates as described above.

As such, the process 500 operates to receive configuration information for a binary library overload operation and configures appliance computing devices to perform the binary library overload operations. As describe in more detail in association with FIG. 6 below, the appliance computing devices execute a write-protected firmware build, and the write-protected binary library that is to be overloaded is replaced for purposes of appliance computing device execution with the designated alternative binary library. The appliance computing devices utilize the configuration information and create a random access memory (RAM) storage area, such as a RAM disk, and execute the alternative binary library from the RAM storage area instead of the overloaded write-protected binary library. The process 500 receives and conveys the overload operation status information that documents execution of the alternative binary library in place of the overloaded write-protected binary library.

FIG. 6 is a flow chart of an example of an implementation of a process 600 for loading remote binaries onto a write-protected device that may be executed by a local library server manager of an appliance computing device, such as the "local" library server manager module 220 of one of the appliance_1 106 through the appliance_N 108. At decision point 602, the process 600 makes a determination as to whether a request to overload a write-protected binary library that forms a portion of a firmware build executed locally by the appliance computing device has been detected. A request to overload a write-protected binary library may be detected, for example, in response to receipt of a binary library overload instruction from the "master" library server manager module 220 executed by the shared library catalog server 110, such as described in association with FIG. 5 and the process 500 described above. The binary library overload instruction may specify one or more write-protected binary libraries of the write-protected firmware build to be overloaded by execution of an alternative binary library instead of the write-protected binary library of the write-protected firmware build.

In response to determining that a request to overload a write-protected binary library that forms a portion of a firmware build executed locally by the appliance computing device has been detected, the process 600 obtains configuration information for the alternative binary library/libraries from a configuration database hosted by the "master" library server manager module 220, such as the configuration database 114, at block 604. The obtained configuration information may include a name of a binary file that comprises the write-protected binary library instructed to be overloaded, a storage location within the configuration database of the alternative binary library, credentials that allow access to the alternative binary library, and an integrity check value associated with the alternative binary library.

At block 606, the process 600 obtains, using the obtained configuration information, the alternative binary library/libraries from the shared library database 112 hosted by the "master" library server manager module 220 of the shared library catalog server 110. It should be noted that the singular form "library" is used throughout FIG. 6 to avoid crowding within the drawing, but that it is understood that the term "library" within FIG. 6 may include one or more libraries, as appropriate for a given overload operation. Obtaining the alternative binary library/libraries may include obtaining one or more binary library files that include the respective alternative binary library or libraries to be used to overload the respective write-protected binary libraries of the local firmware build ordinarily executed by the appliance computing device.

At block 608, the process 600 begins recording status of the write-protected binary library overload operation. At decision point 610, the process 600 makes a determination as to whether to verify the integrity of the alternative binary library/libraries. The determination of whether to verify the integrity of the alternative binary library/libraries may be made based upon a verification instruction within the configuration information or a configuration option on the appliance computing device.

In response to determining to verify the integrity of the alternative binary library/libraries, the process 600 verifies the alternative binary library or libraries at block 612. Verification of the respective binary library or libraries may be performed by executing a verification algorithm to independent recomputed the integrity check value associated with the alternative binary library/libraries that was received/obtained with the configuration information. At decision point 614, the process 600 makes a determination as to whether the integrity of the alternative binary library/libraries verified properly. The process 600 may configure the alternative binary library to execute instead of a write-protected binary library in response to successful verification of the alternative shared library. As such, in response to determining that the integrity of the alternative binary library/libraries did not properly verify, the process 600 generates an error notification at block 616 and returns to decision point 602 and iterates as described above.

In response to determining that the integrity of the alternative binary library/libraries did properly verify at decision point 614, or in response to determining at decision point 610 not to verify the integrity of the alternative binary library/libraries, the process 600 configures a random access memory (RAM) storage area, such as a RAM disk, within RAM at block 618. At block 620, the process 600 stores the shared binary library file that comprises the alternative binary library within the RAM disk.

At decision point 622, the process 600 makes a determination as to whether the write-protected binary library to be overloaded is currently active and in use by any process within the appliance computing device. In response to determining that the write-protected binary library to be overloaded is currently active within the appliance computing device, the process 600 terminates the process(es) that are accessing the write-protected binary library to be overloaded at block 624.

In response to terminating the process(es) that are accessing the write-protected binary library to be overloaded at block 624, or in response to determining that the write-protected binary library to be overloaded is not currently active and is not in use by any process within the appliance computing device at decision point 622, the process 600 sets an environment variable that instructs the appliance computing device to use the alternative binary library instead of the write-protected binary library at block 626 (i.e., overload the write-protected binary library with the alternative binary library). As described above, the environment variable may include an environment variable such as "LD_PRELOAD."

At block 628, the process 600 restarts the binary library based upon the set environment variable to begin execution with the alternative binary library instead of the write-protected binary library that forms a portion of the write-protected firmware build ordinarily executed by the appliance. As described above, the alternative binary library may also be configured to provide status that identifies that the alternative binary library is being executed, and to provide execution status information to developers. At block 630, the process 600 uses the alternative binary library stored within the RAM disk during execution of the appliance computing device instead of the write-protected binary library overloaded by the overload operation.

At decision point 632, the process 600 makes a determination as to whether the current execution and recording of status information is completed. In response to determining that the current execution and recording of status information is completed, the process 600 provides the status information that details execution of the alternative binary library instead of the overloaded write-protected binary library to the "master" library server manager module 220 of the shared library catalog server 110 at block 634.

At decision point 636, the process 600 makes a determination as to whether an instruction to restart execution of the appliance computing device with the write-protected firmware build using the write-protected binary library has been detected/received. Receipt of the instruction to restart execution of the appliance computing device with the write-protected firmware build using the write-protected binary library may be utilized as an acknowledgement of receipt of the status information by the "master" library server manager module 220 of the shared library catalog server 110. In response to determining that an instruction to restart execution of the appliance computing device with the write-protected firmware build using the write-protected binary library has been detected/received, the process 600 restarts the appliance computing device without the alternative binary library and using the write-protected binary library of the write-protected firmware build at block 638. This processing may include a reset sufficient to clear the RAM and RAM disk that stored the alternative binary library. The process 600 returns to decision point 602 and iterates as described above.

As such, the process 600 responds to instructions to overload one or more write-protected binary libraries that form a portion of a local write-protected firmware build. The process 600 may perform a verification check of alternative binary libraries to be used to overload the write-protected binary libraries. The process 600 configures a RAM storage area, such as a RAM disk, with a binary library file that includes the alternative binary libraries and an environmental variable to cause the appliance computing device to restart using the alternative binary libraries instead of the write-protected binary libraries to be overloaded. The process 600 restarts using the alternative binary libraries and provides status of the execution as feedback to developers. The process 600 also restarts at the completion of the overload operation to again use the write-protected binary libraries. It should be noted that the overload processing may additionally be terminated by any restart that clears the RAM because the RAM includes both the alternative binary libraries and the environment variable that designates use of the alternative binary libraries instead of the write-protected binary libraries. Accordingly, the write-protected firmware build of the appliance computing device is unchanged by the binary library overload operation. Additionally, firmware changes may be tested within deployed appliance computing devices without requiring a complete firmware update and without taking the appliances out of service.

As described above in association with FIG. 1 through FIG. 6, the example systems and processes provide technology for loading remote binaries onto a write-protected device. Many other variations and additional activities associated with loading remote binaries onto a write-protected device are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
a memory; and
a processor programmed to:
receive, at an embedded computing device that executes a write-protected firmware build, a binary library overload instruction that specifies a write-protected binary library of the write-protected firmware build to be overloaded by execution of an alternative binary library instead of the write-protected binary library of the write-protected firmware build;
verify integrity of the alternative shared library using an integrity check value obtained within configuration information;
configure, within a random access memory (RAM) storage area of the memory, the alternative binary library to execute instead of the write-protected binary library as specified in the received binary library overload instruction, comprising the processor being programmed to configure the alternative binary library to execute instead of the write-protected binary library in response to successful verification of the alternative shared library; and
execute the write-protected firmware build using the alternative binary library instead of the write-protected binary library specified in the binary library overload instruction.

2. The system of claim 1, where the embedded computing device comprises an appliance computing device, and where:
in being programmed to receive, at the embedded computing device that executes the write-protected firmware build, the binary library overload instruction that specifies the write-protected binary library of the write-protected firmware build to be overloaded by execution of the alternative binary library instead of the write-protected binary library of the write-protected firmware build, the processor is programmed to:
receive the binary library overload instruction at the appliance computing device from a master library server manager module executed by a shared library catalog server; and
the processor is further programmed to obtain the configuration information for use of the alternative binary library from a configuration database hosted by the master library server manager module.

3. The system of claim 2, where:
the obtained configuration information comprises a name of a binary file that comprises the write-protected binary library instructed to be overloaded, a storage location within the configuration database of the alternative binary library, credentials that allow access to the alternative binary library, and the integrity check value associated with the alternative binary library; and
the processor is further programmed to obtain, using the obtained configuration information, the alternative binary library from a shared library database hosted by the master library server manager module.

4. The system of claim 1, where the embedded computing device comprises an appliance computing device, and where in being programmed to configure, within the RAM storage area of the memory, the alternative binary library to execute instead of the write-protected binary library as specified in the received binary library overload instruction, the processor is programmed to:
configure a RAM disk within the RAM storage area of the memory;
obtain a shared binary library file that comprises the alternative binary library;
store the shared binary library file that comprises the alternative binary library within the RAM disk; and
set an environment variable that instructs the appliance computing device to use the alternative binary library instead of the write-protected binary library that forms the portion of the write-protected firmware build.

5. The system of claim 4, where in being programmed to execute the write-protected firmware build using the alternative binary library instead of the write-protected binary library specified in the binary library overload instruction, the processor is programmed to:
use, based upon the set environment variable in response to a binary library restart, the alternative binary library stored within the RAM disk during execution of the appliance computing device instead of the write-protected binary library that forms the portion of the write-protected firmware build; and
provide status information that details execution of the alternative binary library instead of the write-protected binary library.

6. The system of claim 1, where the embedded computing device comprises an appliance computing device, and where the processor is further programmed to:
determine whether the write-protected binary library specified in the received binary library overload instruction to be overloaded is active on the appliance computing device; and
terminate, in response to determining that the write-protected binary library specified in the received binary library overload instruction to be overloaded is active on the appliance computing device, at least one associated process that accesses the write-protected binary library.

7. A system, comprising:
a memory; and
a processor programmed to:
receive, at an embedded computing device that comprises an appliance computing device and that executes a write-protected firmware build, a binary library overload instruction that specifies a write-protected binary library of the write-protected firmware build to be overloaded by execution of an alternative binary library instead of the write-protected binary library of the write-protected firmware build;
configure, within a random access memory (RAM) storage area of the memory, the alternative binary library to execute instead of the write-protected binary library as specified in the received binary library overload instruction;
receive an instruction to restart execution of the appliance computing device with the write-protected firmware build using the write-protected binary library;
restart the appliance computing device in conjunction with clearing the RAM storage area; and
execute and use the write-protected firmware build using the alternative binary library instead of the write-protected binary library of the write-protected firmware build specified in the binary library overload instruction during execution of the appliance computing device.

8. The system of claim 7, where:
in being programmed to receive, at the embedded computing device that comprises the appliance computing device and that that executes the write-protected firmware build, the binary library overload instruction that specifies the write-protected binary library of the write-protected firmware build to be overloaded by execution of the alternative binary library instead of the write-protected binary library of the write-protected firmware build, the processor is programmed to:
receive the binary library overload instruction at the appliance computing device from a master library server manager module executed by a shared library catalog server; and
the processor is further programmed to obtain configuration information for use of the alternative binary library from a configuration database hosted by the master library server manager module.

9. The system of claim 7, where in being programmed to configure, within the RAM storage area of the memory, the alternative binary library to execute instead of the write-protected binary library as specified in the received binary library overload instruction, the processor is programmed to:
configure a RAM disk within the RAM storage area of the memory;
obtain a shared binary library file that comprises the alternative binary library;
store the shared binary library file that comprises the alternative binary library within the RAM disk; and
set an environment variable that instructs the appliance computing device to use the alternative binary library instead of the write-protected binary library that forms the portion of the write-protected firmware build.

10. The system of claim 7, where the processor is further programmed to:
determine whether the write-protected binary library specified in the received binary library overload instruction to be overloaded is active on the appliance computing device; and
terminate, in response to determining that the write-protected binary library specified in the received binary library overload instruction to be overloaded is active on the appliance computing device, at least one associated process that accesses the write-protected binary library.

11. A computer program product, comprising:
a computer readable storage medium having computer readable program code embodied therewith, where the computer readable program code when executed on an embedded computing device causes the embedded computing device to:
receive a binary library overload instruction that specifies a write-protected binary library of a write-protected firmware build executed by the embedded computing device to be overloaded by execution of an alternative binary library instead of the write-protected binary library of the write-protected firmware build;
verify integrity of the alternative shared library using an integrity check value obtained within configuration information;
configure, within a random access memory (RAM) storage area, the alternative binary library to execute instead of the write-protected binary library as specified in the received binary library overload instruction, comprising the computer readable program code when executed on the embedded computing device causing the embedded computing device to configure the alternative binary library to execute instead of the write-protected binary library in response to successful verification of the alternative shared library; and
execute the write-protected firmware build using the alternative binary library instead of the write-protected binary library specified in the binary library overload instruction.

12. The computer program product of claim 11, where:
in causing the embedded computing device to receive the binary library overload instruction that specifies the write-protected binary library of the write-protected firmware build executed by the embedded computing device to be overloaded by execution of the alternative binary library instead of the write-protected binary library of the write-protected firmware build, the computer readable program code when executed on the embedded computing device causes the embedded computing device to:
receive the binary library overload instruction from a master library server manager module executed by a shared library catalog server; and
the computer readable program code when executed on the embedded computing device further causes the embedded computing device to obtain the configuration information for use of the alternative binary library from a configuration database hosted by the master library server manager module.

13. The computer program product of claim 12, where:
the obtained configuration information comprises a name of a binary file that comprises the write-protected binary library instructed to be overloaded, a storage location within the configuration database of the alternative binary library, credentials that allow access to the alternative binary library, and the integrity check value associated with the alternative binary library; and
where the computer readable program code when executed on the embedded computing device further causes the embedded computing device to obtain, using the obtained configuration information, the alternative binary library from a shared library database hosted by the master library server manager module.

14. The computer program product of claim 11, where in causing the embedded computing device to configure, within the RAM storage area, the alternative binary library to execute instead of the write-protected binary library as specified in the received binary library overload instruction, the computer readable program code when executed on the embedded computing device causes the embedded computing device to:
configure a RAM disk within the RAM storage area;
obtain a shared binary library file that comprises the alternative binary library;
store the shared binary library file that comprises the alternative binary library within the RAM disk; and
set an environment variable that instructs the embedded computing device to use the alternative binary library instead of the write-protected binary library that forms the portion of the write-protected firmware build.

15. The computer program product of claim 14, where in causing the embedded computing device to execute the write-protected firmware build using the alternative binary library instead of the write-protected binary library specified in the binary library overload instruction, the computer readable program code when executed on the embedded computing device causes the embedded computing device to:
use, based upon the set environment variable in response to a binary library restart, the alternative binary library stored within the RAM disk during execution of the embedded computing device instead of the write-protected binary library that forms the portion of the write-protected firmware build; and provide status information that details execution of the alternative binary library instead of the write-protected binary library.

16. The computer program product of claim 11, where the computer readable program code when executed on the embedded computing device further causes the embedded computing device to:

determine whether the write-protected binary library specified in the received binary library overload instruction to be overloaded is active on the embedded computing device; and terminate, in response to determining that the write-protected binary library specified in the received binary library overload instruction to be overloaded is active on the embedded computing device, at least one associated process that accesses the write-protected binary library.

17. A computer program product, comprising:

a computer readable storage medium having computer readable program code embodied therewith, where the computer readable program code when executed on an embedded computing device causes the embedded computing device to:

receive a binary library overload instruction that specifies a write-protected binary library of a write-protected firmware build executed by the embedded computing device to be overloaded by execution of an alternative binary library instead of the write-protected binary library of the write-protected firmware build;

configure, within a random access memory (RAM) storage area, the alternative binary library to execute instead of the write-protected binary library as specified in the received binary library overload instruction;

receive an instruction to restart execution of the embedded computing device with the write-protected firmware build using the write-protected binary library;

restart the embedded computing device in conjunction with clearing the RAM storage area; and execute and use the write-protected firmware build using the alternative binary library instead of the write-protected binary library of the write-protected firmware build specified in the binary library overload instruction during execution of the embedded computing device.

18. The computer program product of claim 17, where:

in causing the embedded computing device to receive the binary library overload instruction that specifies the write-protected binary library of the write-protected firmware build executed by the embedded computing device to be overloaded by execution of the alternative binary library instead of the write-protected binary library of the write-protected firmware build, the computer readable program code when executed on the embedded computing device causes the embedded computing device to:

receive the binary library overload instruction from a master library server manager module executed by a shared library catalog server; and the computer readable program code when executed on the embedded computing device further causes the embedded computing device to obtain configuration information for use of the alternative binary library from a configuration database hosted by the master library server manager module.

19. The computer program product of claim 17, where in causing the embedded computing device to configure, within the RAM storage area, the alternative binary library to execute instead of the write-protected binary library as specified in the received binary library overload instruction, the computer readable program code when executed on the embedded computing device causes the embedded computing device to:

configure a RAM disk within the RAM storage area;

obtain a shared binary library file that comprises the alternative binary library;

store the shared binary library file that comprises the alternative binary library within the RAM disk; and set an environment variable that instructs the embedded computing device to use the alternative binary library instead of the write-protected binary library that forms the portion of the write-protected firmware build.

20. The computer program product of claim 17, where the computer readable program code when executed on the embedded computing device further causes the embedded computing device to:

determine whether the write-protected binary library specified in the received binary library overload instruction to be overloaded is active on the embedded computing device; and terminate, in response to determining that the write-protected binary library specified in the received binary library overload instruction to be overloaded is active on the embedded computing device, at least one associated process that accesses the write-protected binary library.

* * * * *